(12) United States Patent
McKinnon et al.

(10) Patent No.: US 6,175,565 B1
(45) Date of Patent: *Jan. 16, 2001

(54) SERIAL TELEPHONE ADAPTER

(75) Inventors: Peter McKinnon; Jiri Pek, both of Kanata (CA)

(73) Assignee: Nokia Corporation, Tampere (FI)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/932,305

(22) Filed: Sep. 17, 1997

(51) Int. Cl.[7] ............... G06F 15/16; G01R 3/08; H04L 12/66
(52) U.S. Cl. ............... 370/354; 370/217; 370/242; 379/900; 709/203
(58) Field of Search .................. 370/352, 401, 370/356, 468, 349, 217, 354, 242; 375/222; 379/900, 212, 93.01; 703/23; 395/500; 709/202, 203

(56) References Cited

U.S. PATENT DOCUMENTS

| | | | |
|---|---|---|---|
| 5,652,866 | * 7/1997 | Aldred et al. | 703/23 |
| 5,726,984 | * 3/1998 | Kubler et al. | 370/349 |
| 5,838,682 | * 11/1998 | Dekelbaum et al. | 370/401 |
| 5,892,764 | * 4/1999 | Riemann et al. | 370/401 |
| 5,940,479 | * 8/1999 | Guy et al. | 379/93.01 |
| 5,974,043 | * 10/1999 | Solomon | 370/352 |
| 5,999,612 | * 12/1999 | Dunn et al. | 379/212 |
| 5,999,965 | * 12/1999 | Kelly | 709/202 |

* cited by examiner

Primary Examiner—Hassan Kizou
Assistant Examiner—John Pezzlo
(74) Attorney, Agent, or Firm—Marks & Clerk

(57) ABSTRACT

A serial telephone adapter for connection between a telephone and a personal computer to facilitate voice over computer-based networks such as the Internet. The adapter also includes an interface to the public switched telephone network for conventional voice communications when the personal computer is shut down.

10 Claims, 3 Drawing Sheets

SERIAL TELEPHONE ADAPTER

FIELD OF THE INVENTION

This invention relates to a telephone adapter for use between a telephony terminal (telephone) and a client such as a personal computer and more specifically to a serial telephone adapter (STA) which facilitates transmission of voice over a computer-based network such as the Internet or an Intranet.

BACKGROUND

Communications networks such as the public Internet and private Intranets are becoming increasingly more accessible to individuals in both the home and office environments. Concomitant with the growth in Internet/Intranet services has been an increase in attempts to provide voice access between subscribers to the Internet as well as other computer-based networks.

In the context of full duplex voice communications over Internet/Intranet networks a multimedia personal computer equipped with a full duplexed sound card is required. In this configuration a sound blaster-compatible card, or equivalent, with an Internet telephone application running on the PC is normally used. This system does represent a new paradigm for voice communications but it does have several undesirable short comings. Since it relies on a sound-blaster compatible card in the personal computer it excludes the traditional telephone instrument. Because of the speaker-phone-like environment of the personal computer configuration a user of the system does not enjoy privacy in either transmission or receipt of voice messages. The system is also prone to inherent latency. There is also no fall back position should the Internet connection be lost or if the computers at either end of the conversation shut down.

The telephone adapter according to the present invention overcomes the aforementioned shortcomings in that it enables full duplex voice communication over Internet/Intranet networks using traditional telephone instruments. This, of course, provides improved privacy to the user. Additionally, the adapter interfaces with the public switched telephone network which allows the telephone to be used in its normal mode when the computer is turned off or otherwise disabled.

Briefly, therefore, the present invention enables traditional telephone instruments to be used for voice communications over IP networks. Users are not threatened with computer interfaces. Latencies due to operating system interfaces to sound cards are eliminated. Once the computer is turned off a path to the traditional telephone network is created.

The invention is applicable to the following technologies: a) voice over Internet/Intranet; b) telephony over the Internet/Intranet; c) PABX systems for Internet/Intranet; d) multimedia personal computers including Windows 95 and WindowsNT.

Therefore, in accordance with a first aspect of the present invention there is provided a system for use with a telephony terminal and a client to provide telephone access to a computer-based network via the client. The system comprises: means in the client to execute an operating system program; an adapter serially connected between the terminal and the client, the adapter having means to receive and transmit respectively telephony communications from and to the terminal; means to convert the telephony communications from analog to digital and digital to analog; and means to control transfer of converted telephone communications between the client and the adapter; and a system transfer protocol to coordinate transfer of telephony communications between the client and the adapter.

In accordance with a second aspect of the present invention there is provided an adapter for serial connection between a telephone terminal and a personal computer to provide telephony access to a communications network via the personal computer. The adapter has means to receive and digitize analog signals from the telephone terminal; means to receive digitized signals from the computer and to convert the digitized signals to analog form and means to transfer the signals between the computer and the telephone terminal.

In accordance with a third aspect of the present invention there is provided a method of transmitting voice communications over the Internet comprising: providing the voice communications via a telephone terminal to a serially-connected telephone adapter; digitizing the analog voice communications in the adapter; transferring the digitized signals to a serially-connected personal computer having access to the Internet; packetizing the digitized message and transporting the digitized signal to a selected destination in accordance with an operating program installed in the computer.

In accordance with a preferred embodiment of the method aspect, the voice message is received at the destination by a second computer wherein the signal in digital form is depacketized, transferred to the adapter whereat the digital signal is converted to analog form and subsequently provided to a second telephone terminal.

BRIEF DESCRIPTION OF THE DRAWINGS

The invention will now be described in greater detail with reference to the attached drawings wherein.

DETAILED DESCRIPTION OF THE INVENTION

Figure 1:
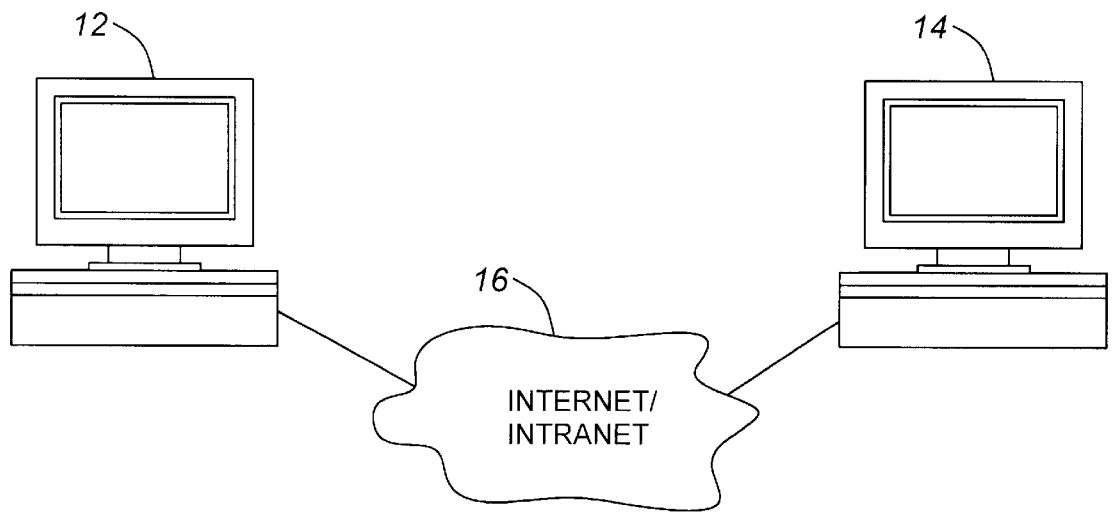
FIG. 1 represents a prior art voice over Internet system.

FIG. 1 illustrates a known voice over Internet architecture. Briefly, client or personal computers 12 and 14 are connected to the Internet 16 via a service provider. Computers 12 and 14 are provided with a sound blaster-compatible card or equivalent and the usual internal or external microphone and speakers. Such operation can be likened to the use of a conventional telephone in speaker mode which does not provide any user privacy.

Figure 2:
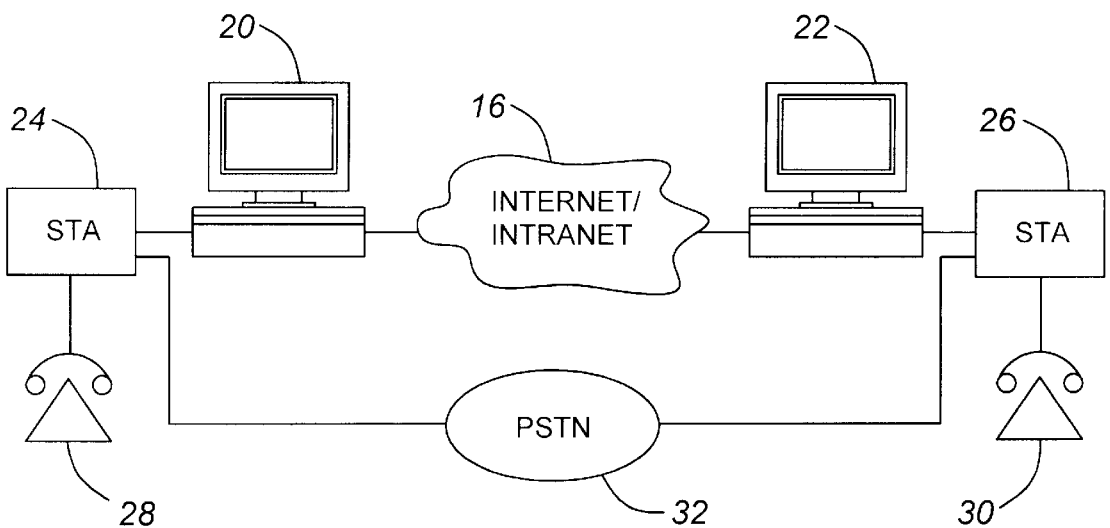
FIG. 2 is a block diagram of the system according to the present invention.

FIG. 2 illustrates in block diagram form the system of the present invention. In the manner shown in FIG. 1 the system operates via the public Internet or a private Intranet 16. Computers 20 and 22 are connected to the Internet via means which are well-known. In the system according to the invention, however, computers 20 and 22 do not rely on a sound blaster-compatible card within the personal computer for voice communications. In FIG. 2 serial telephone adapter (STA) units 24 and 26 are connected to the computer via one of the PC serial communications ports (com 1 or com 2). STA units 24 and 26 are connected serially to telephony terminals such as telephones 28 and 30 respectively. Also, as shown in FIG. 2 STA units 24 and 26 are connected to the public switched telephone network 32 so that if the telephone is not being used to communicate over the Internet/Intranet it can be used in its normal mode of operation. By incorporating an interface to a traditional telephone instrument, the serial telephone adapter enables voice communications from a traditional telephone instrument to be transported through a personal computer over Internet/Intranet networks. Furthermore, it incorporates an interface to an analog telephone line (PABX or central office) for voice communications in the event the PC is turned off or non-operational in general.

Briefly, from the telephone instrument, the serial telephone adapter digitizes the voice and transmits a digital stream to the PC over the serial port using asynchronous communication. The voice stream is then packetized for transmission over the IP network. From the IP network, voice is depacketized and the digital stream is received by the serial telephone adapter, converted to analog and presented to the analog telephone instrument.

Figure 3:
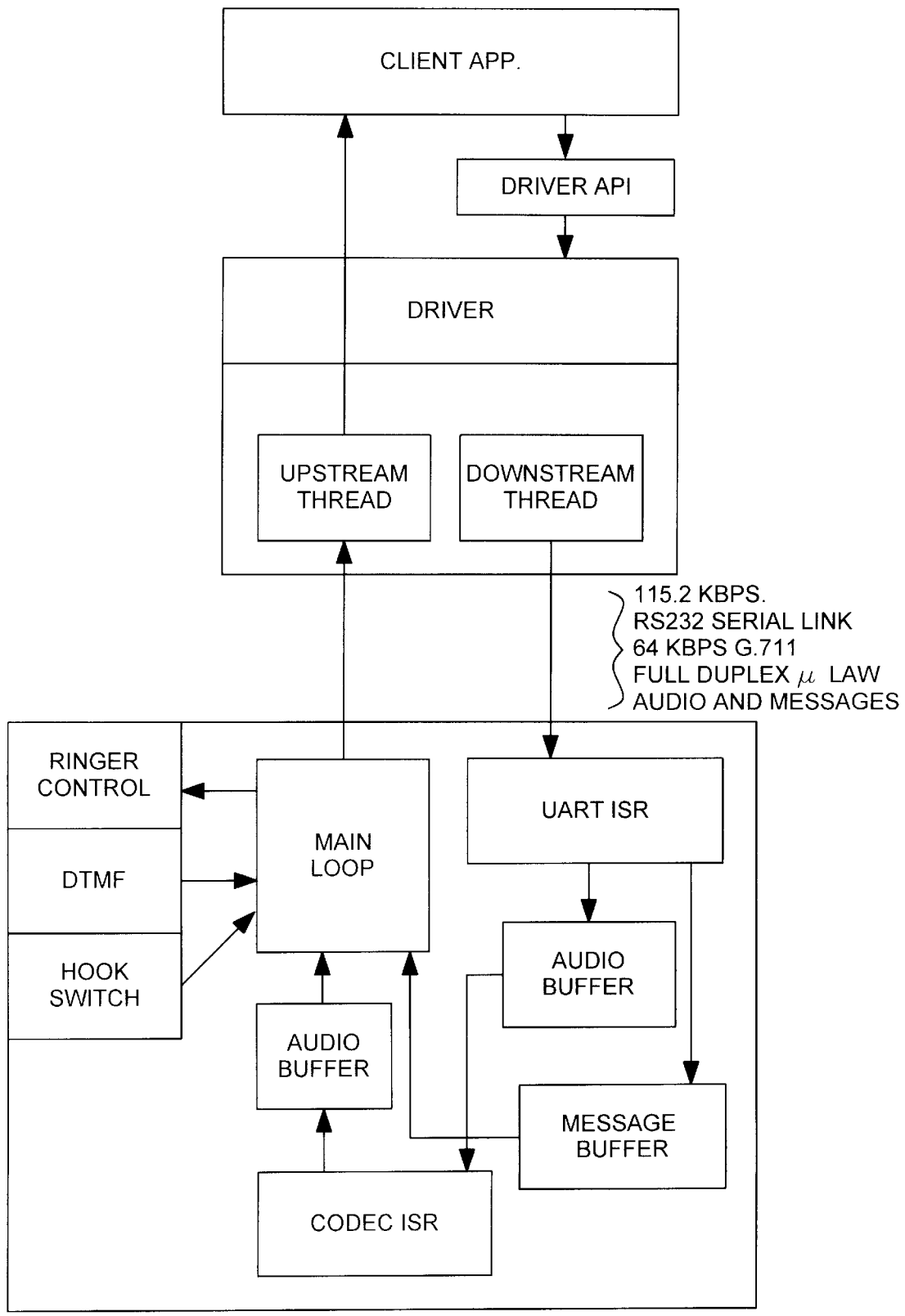
FIG. 3 is a block diagram showing the components of the system.

As shown in FIG. 3, the main components of the serial telephone adapter software are Win32 Driver executing under Microsoft Windows 95 or WindowsNT on a personal computer. This software could be easily ported to any operating system on any platform, although implementation on a platform that supports multi-tasking makes the task easier. The second component is the serial telephone adapter firmware executing on a micro-controller within the adapter box. A 6805 micro-controller may be used. The third component is the protocol used for transfer of audio and messages between the PC and the adapter. A universal asynchronous receiver transmitter (UART) is used in both the PC and the adapter. Both are configured for transferring audio and messages between the PC and adapter within the same channel at 115.2 kilobits per second. Different protocols are used in each direction. Audio and messages are transferred between the units over a single RS 232 serial link. The audio message is G.711 in mulaw where the audio signal is coded as a 64 kilobit per second stream of byte values. Messages are embedded within both the upstream and downstream audio byte streams as a fixed number of bytes prefixed by the escape byte to indicate the start of a message. The escape byte value is 0x7F which was chosen since all instances of 0x7F occurring in the G.711 mulaw audio stream can be replaced by the value 0xFF which represents an equivalent audio signal level. The format and meaning of the various messages will be discussed later.

Only downstream control messages are acknowledged in order to simplify the adapter firmware design to fit within the adapter resource limitations. Each control message sent from the PC to the serial telephone adapter (STA) is acknowledged and the PC will not send a new control message until the acknowledgment is received from the adapter for the current message. The driver will start a timer when a control message is sent. If the acknowledgment is received then the timer is canceled and the driver is free to send a new message, otherwise the timer will expire causing the driver to resend the control message. Up to three resends will be attempted until the driver assumes that the adapter is malfunctioning and the client application or PC is informed. Audio and message transfer flow control is performed only in the downstream direction from within the adapter's UART interrupt service routines (ISR) due to the limited RAM buffer size in the adapter. The RS232 clear to send (CTS) signal line is toggled by the adapter as follows:

High: Downstream audio and message transfer is enabled when the number of bytes in the STA audio receive buffer drops below a fixed low water mark threshold.

Low: Downstream audio and message transfer is enabled when the number of bytes in the STA audio receive buffer rises above a fixed high water mark threshold.

Although the STA has separate buffers for downstream audio and downstream messages, and messages are sent one at a time, both downstream audio and downstream message transfer is suspended when CTS transitions from a low level to a high level. The CTS signal is handled transparently by the Win32 communications port driver.

The STA implements an optional software watchdog timer that, if enabled must be reset at least once every 19 seconds by a watchdog kick message received from the driver. If the timer is not reset before it expires, then the STA will reset.

The Win32 driver essentially consists of two threads that are integrated with the client application namely a downstream transfer thread and an upstream transfer thread. These threads use the Win32 communications port API.

The downstream transfer thread is responsible for receiving downstream bound uncompressed audio and sending the audio and messages from the PC to the STA via the serial port.

A client application controls the downstream transfer thread through an API to start or stop the audio transfer and to send command messages to the STA.

The upstream transfer thread is responsible for receiving uncompressed audio and messages sent by the STA to the PC via the serial port, and sending the audio upstream.

A client application controls the upstream transfer thread through an API to start or stop the audio transfer. Indication messages (such as off-hook) sent upstream from the STA to the driver are communicated to the client application through the client application's API.

As shown in FIG. 1 the STA firmware essentially consists of 3 main components:

1) UART (Universal Asynchronous Receiver Transmitter) interrupt service routine (ISR);
2) Codec interrupt service routine (ISR) and
3) Main program loop.

The UART ISR receives bytes sent from the PC and stores them in a buffer implemented as a circular queue referred to as the downstream buffer (if the queue is not full). UART interrupts occur once for every byte sent by the PC.

The Codec ISR receives audio bytes from the codec at a rate of 8 Kbytes/second and stores them in a buffer implemented as a circular queue referred to as the upstream buffer. If the queue if full then bytes are 'dropped'. In practice this is a rare occurrence, so upstream audio quality is not degraded. Audio bytes with value of 0x7F are replaced with 0xFF.

The main loop performs the following functions:
Processing control messages received from the PC.
Polling of the STA's DTMF tone receiver.
Polling of the STA's hook switch and debounce.
Forming and sending indication messages via the UART.
Sending audio upstream via the UART.

As described earlier, control messages received by the UART ISR are stored in a message buffer until they are processed, and once processed they are acknowledged.

The STA hardware implements a DTMF receiver, which is polled once each pass through the main program loop. If the receiver indicates that a DTMF tone is present in the current upstream audio stream, then the DTMF digit is read from a register and the digit is encoded in an upstream indication message sent to the PC.

The STA hardware indicates the state of the hook switch, which is polled 3 times in succession each pass through the main program loop in order to denounce the switch. If a change of state is detected, then the new state of the hook switch is encoded within an upstream indication message sent to the PC.

Upstream audio is read from the upstream audio buffer transferred to the PC continuously until a control message is received from the PC instructing the STA to stop sending the audio.

Figure 4:
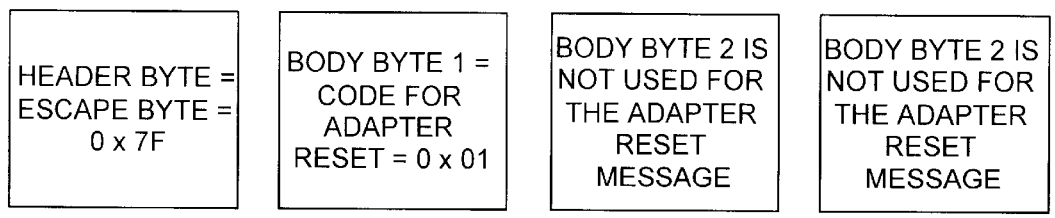
FIG. 4 illustrates the format of the adapter reset message.

The messaging protocols will now be discussed in greater detail. Messages sent from the PC to the adapter consist of a header byte (0x7F) followed by 3 body bytes and are transmitted on the same channel as audio bytes. The header byte acts as an escape character to indicate that message bytes follow. Therefore the PC substitutes audio bytes with the byte value of 0x7F with 0xFF. As an example, FIG. 4 illustrates the adapter reset message format.

All messages sent from the PC to the adapter are acknowledged by the adapter. The PC must wait for each message to be acknowledged by the adapter before attempting to send another message. Alternatively, a sufficient period of time must be allowed to elapse before attempting to send another message. This time in a preferred embodiment is 500 ms as this is sufficient time for the adapter to process a message, and be ready to receive a new message.

In general, messages can be sent to the adapter at any time, in any order without causing operational problems except as noted for each message.

Messages sent from the adapter to the PC consist of a header byte (0x7F) followed by 1 body byte and are transmitted on the same channel as audio bytes. The header acts as an escape character to indicate that message bytes follow. Therefore the adapter substitutes audio bytes with the byte value of 0x7F with 0xFF.

A message is sent from the adapter to the PC whenever a switch state change is detected, or whenever the adapter is reset, or to acknowledge a message received from the PC. Messages sent from the adapter to the PC are not acknowledged by the PC. The adapter is constantly transmitting audio, therefore each byte received by the PC must be examined to determine if it is a message header byte. The following byte is assumed to be the message body byte.

Table 1 lists the formats for the body of messages sent from the PC to the adapter. Some messages take parameters, while others do not.

TABLE 1

PC To Adapter Messages

| Body byte 1: Message Type | Code | Body byte 2: Parameter 1 | Codes | Body byte 3: Parameter 2 | Codes |
|---|---|---|---|---|---|
| Null message | 0x00 | N/A | N/A | N/A | N/A |
| Reset | 0x01 | N/A | N/A | N/A | N/A |
| Codec Control | 0x07 | Codec Register Number | See codec documentation. | Codec Register Value | See codec documentation. |
| Analog Loopback | 0x08 | On or Off | 0x00 = Off 0x01 = On | N/A | N/A |
| Kick Watchdog | 0x09 | N/A | N/A | N/A | N/A |
| Switch Watchdog | 0x0A | On or Off | 0x00 = Off 0X01 = On | N/A | N/A |
| Watchdog Timeout Time Multiple | 0x0B | Multiple Value | 0x00 to 0xFF (0 to 255 * 6.375 sec.) | N/A | N/A |
| Ringer Start | 0x0D | Cadence Pattern | Each bit represents 0.50 sec. If bit is set, ringer is on for 0.50 sec. Etc. | N/A | N/A |
| Ringer Stop | 0x0E | N/A | N/A | N/A | N/A |
| DTMF Mute On | 0x10 | N/A | N/A | N/A | N/A |
| DTMF Mute Off | 0x11 | N/A | N/A | N/A | N/A |
| PBX Mode | 0x12 | N/A | N/A | N/A | N/A |
| PC Mode | 0x13 | N/A | N/A | N/A | N/A |

Figure 5:
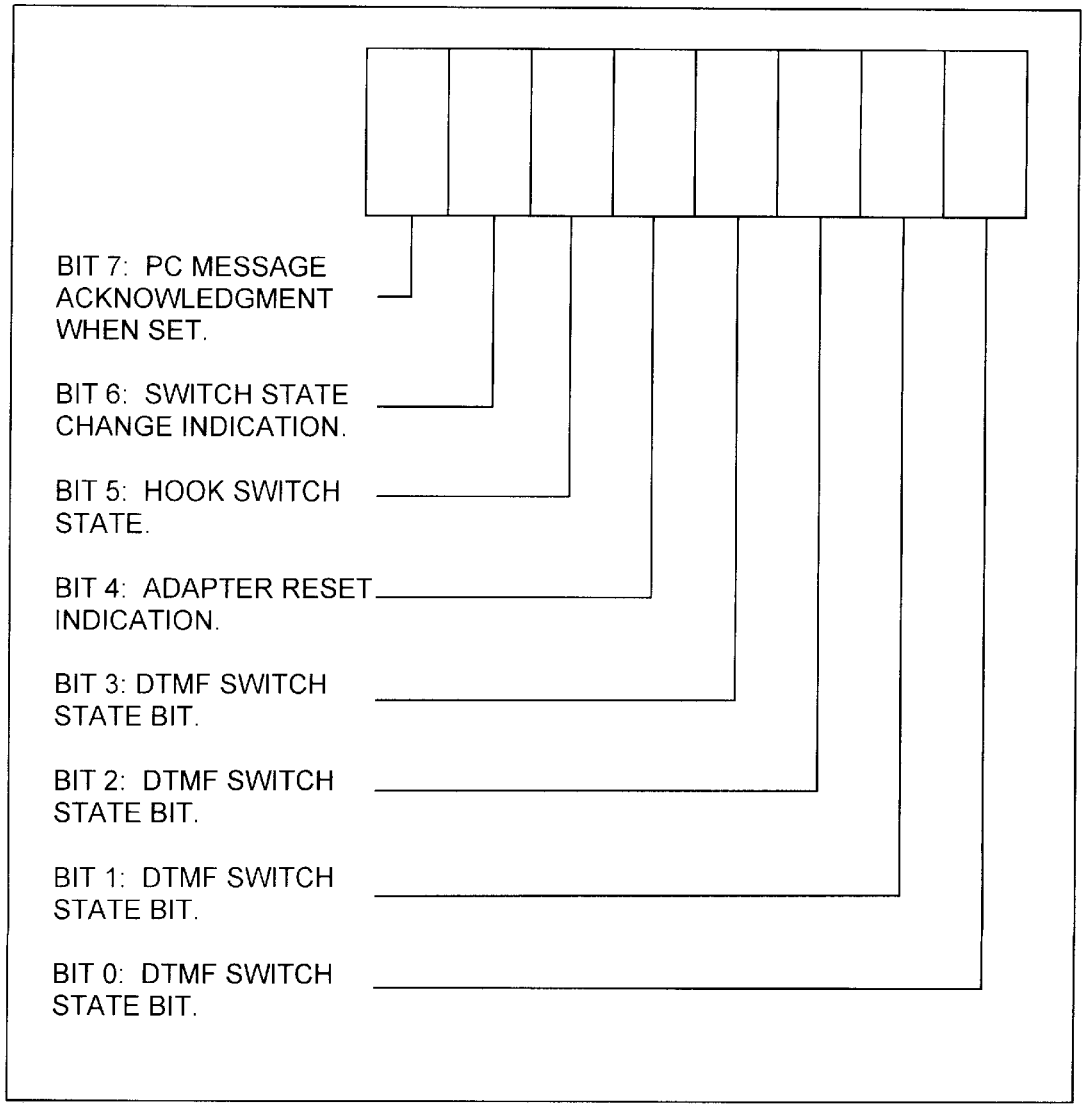
FIG. 5 shows the adapter to PC message encoding.

All adapter to PC messages are encoded within a single message body byte as illustrated in FIG. 5.

Adapter message bit 7 is set to acknowledge a message previously sent to the adapter.

Adapter message bit 6 is set when the state of the adapter switches (hook switch and/or DTMF digit buttons) has changed.

Adapter message bit 5 is set when the receiver of the phone set attached to the adapter is off-hook. This bit is cleared when the receiver is on-hook.

Adapter message bit 4 is set when the adapter is reset due to power-up, or watchdog time-out.

Adapter message bits 0 through 3 represent the current state of the DTMF digit buttons of the phone set attached to the adapter. Table 2 maps the digits to the 4 bit code.

TABLE 2

DTMF Digit Encoding

| DTMF Digit | Code |
|---|---|
| 1 | 0x1 |
| 2 | 0x2 |
| 3 | 0x3 |
| 4 | 0x4 |
| 5 | 0x5 |
| 6 | 0x6 |
| 7 | 0x7 |
| 8 | 0x8 |
| 9 | 0x9 |
| 0 | 0xA |
| * | 0xB |
| # | 0xC |

While a preferred embodiment of the invention has been described and illustrated it will be apparent to one skilled in the art that numerous changes may be made without departing from the basic concept. It is to be understood, however, that such changes will fall within the scope of this invention as defined in the appended claims.

What is claimed is:

1. A system for use with a telephony terminal and a personal computer to provide telephone access to a computer-based communications network via said personal computer, said system comprising:
   application software in said personal computer to execute an operating system program;
   a serial telephone adapter connected between said telephony terminal and a serial communications port on said personal computer, said adapter having a receiver/ transmitter to receive and transmit respectively telephony communications from and to said terminal, and a converter to convert said telephony communications from analog to digital and digital to analog;

a system transfer protocol to coordinate transfer of telephony communications and control messages between said personal computer and said serial telephone adapter said protocol requiring that control messages from the personal computer to the serial telephone adapter be acknowledged by the serial telephone adapter before another control message is sent; and an interface in said adapter to connect said telephony terminal to the public switched telephone network (PSTN) if said computer-based communications network is not available for service.

2. A system as defined in claim 1 wherein said computer-based communications network is the Internet.

3. A system as defined in claim 1 wherein said computer-based communications network is an Intranet.

4. A system as defined in claim 1 wherein said telephony terminal is a telephone.

5. A system as defined in claim 1 wherein said system transfer protocol implements a polling sequence to detect DTMF tone signaling.

6. A system as defined in claim 1 wherein said system transfer protocol implements a polling sequence to detect hook switch changes.

7. A system as defined in claim 1 wherein said system transfer protocol transfers messages utilizing header bytes and body bytes.

8. A telephone adapter for serial connection between a telephone terminal and a personal computer to provide telephony access to a computer-based communications network via said personal computer, said adapter having: a converter to receive and digitize analog signals from said telephone terminal and to receive digitized signals from said personal computer and to convert said digitized signals to analog form; a controller to control transfer of said signals and control messages between said personal computer and said telephone terminal, said controller implementing a protocol whereby a control message from said personal computer to said telephone adapter must be acknowledged by said telephone adapter before another control message can be sent by said personal computer; and an interface to selectively connect said telephone terminal to the public switched telephone network (PSTN) if said personal computer is non-operational.

9. A method of transmitting voice communications over the Internet comprising:

inputting said voice communications via a telephone terminal to a serially-connected telephone adapter;

digitizing said voice communications in said adapter;

transferring said digitized signals to a personal computer serially connected to said adapter, said personal computer having access to said Internet;

packetizing said digitized message;

providing universal asynchronous receiver transmitters (UARTs) in said telephone adapter and said personal computer for asynchronous transfer of control messages therebetween, wherein a control message from said personal computer to said adapter must be acknowledged by said adapter before another control message can be sent by said personal computer;

transporting said digitized signal to a selected destination in accordance with an operating program installed in said computer; and providing said adapter with an interface to the PSTN whereby said voice communications can be transmitted over the PSTN if communication over said Internet goes out of service.

10. A method as defined in claim 9 wherein said voice message is received at said destination by a second computer wherein said signal in digital form is depacketized, transferred to said adapter whereat said digital signal is converted to analog form and provided to a second telephone terminal.

* * * * *